United States Patent [19]

Davies

[11] Patent Number: 4,477,973
[45] Date of Patent: Oct. 23, 1984

[54] THREE DIMENSIONAL GRAPHICS TABLET
[75] Inventor: David L. Davies, Guilford, Conn.
[73] Assignee: Micro Control Systems, Inc., Vernon, Conn.
[21] Appl. No.: 397,976
[22] Filed: Jul. 14, 1982
[51] Int. Cl.³ .............................................. G01B 7/03
[52] U.S. Cl. ..................... 33/1 CC; 33/1 M; 33/1 PT; 340/678
[58] Field of Search ............... 33/1 CC, 1 M, 174 J, 33/1 MP, 1 PT; 340/686, 687, 678

[56] References Cited
U.S. PATENT DOCUMENTS

| | | |
|---|---|---|
| 2,475,245 | 7/1949 | Leaver et al. . |
| 2,537,770 | 1/1951 | Livingston et al. . |
| 2,538,226 | 1/1951 | Anderson et al. . |
| 2,906,179 | 9/1959 | Bower .............................. 33/1 CC X |
| 2,931,573 | 4/1960 | Story . |
| 3,106,707 | 10/1963 | Thompson . |
| 3,182,399 | 5/1965 | Price . |
| 3,295,210 | 1/1967 | Kelsey . |
| 3,346,724 | 10/1967 | Fuhrmeister et al. . |
| 3,369,301 | 2/1968 | Brouwer . |
| 3,553,680 | 1/1971 | Cooreman . |
| 3,561,125 | 2/1971 | Zeidler . |
| 3,582,956 | 6/1971 | Huston et al. . |
| 3,613,066 | 10/1971 | Cooreman . |
| 3,675,333 | 7/1972 | Wilson . |
| 3,731,995 | 5/1973 | Reiffel . |
| 3,792,243 | 2/1974 | Appel et al. . |
| 3,806,912 | 4/1974 | Eckert . |
| 3,832,781 | 9/1974 | Flagge . |
| 3,883,861 | 5/1975 | Heartz . |
| 3,919,691 | 11/1975 | Noll . |
| 3,921,165 | 11/1975 | Dym . |
| 3,939,569 | 2/1976 | Squires . |
| 3,944,798 | 3/1976 | Eaton . |
| 3,991,636 | 11/1976 | Devillers et al. . |
| 4,078,314 | 3/1978 | McMurtry . |
| 4,104,648 | 8/1978 | Blumenthal et al. . |
| 4,118,871 | 10/1978 | Kirkham . |
| 4,122,607 | 10/1978 | Hopf . |
| 4,176,455 | 12/1979 | Copeland et al. . |
| 4,196,473 | 4/1980 | Chea . |
| 4,240,205 | 12/1980 | Toss ................................. 33/1 M |
| 4,249,314 | 2/1981 | Beck ............................. 33/1 CC X |
| 4,270,277 | 6/1981 | Koenuma ........................... 33/1 M |
| 4,317,383 | 3/1982 | Kurosaki et al. . |
| 4,331,954 | 5/1982 | Bauman et al. . |

OTHER PUBLICATIONS

Versa Computing, Inc. Newbury Park, CA 91320, Versawriter Reference Manual, Dec. 1980.

Primary Examiner—William D. Martin, Jr.
Attorney, Agent, or Firm—Kenway & Jenney

[57] ABSTRACT

A three dimensional graphics tablet for determining the three dimensional coordinates of points on an object placed on a supporting plane. The apparatus includes an articulated arm having at least two link elements connecting a contacting tip element to the support for rotational movement about a plurality of mutually angulated axes. By means of the arm articulation, the contacting tip element can be moved to arbitrary locations within a defined volume. Potentiometers are provided for measuring each of the angles of rotation about the mutually angulated axes. These potentiometers generate signals which collectively determine the coordinates of the location of the tip element. Embodiments are disclosed having three and four degrees of freedom.

3 Claims, 7 Drawing Figures

THREE DIMENSIONAL GRAPHICS TABLET

BACKGROUND OF THE INVENTION

This invention relates to graphics tablets and more particularly to a graphics tablet capable of resolving the three dimensional coordinates of objects. The widespread availability of digital computers has created a demand for coordinate digitizers, that is, apparatus for supplying the coordinates of points to the data storage element within the computer. Once the coordinates are stored in the computer, suitable software can operate on the stored coordinates to generate graphical displays representing the object whose surface points were measured and stored. Known apparatus particularly adapted for use by hobbyists has been limited to two dimensional digitizers. One known system is disclosed in U.S. Pat. No. 4,334,954. In this apparatus two arms are pivotably interconnected to one another so that a pointer can be moved to generally arbitrary points within the plane of a support. In operation, a sketch, graph or other two-dimensional representation is placed on a support beneath the pointer. As the pointer moves along the graph or sketch, signals from two potentiometers are applied to the input of a computer wherein the signals are stored in digital form. Software can be provided to act on the potentiometer output signals to provide the two dimensional coordinates of points beneath the pointer. This device, therefore, is inherently limited to operations within a plane.

Three dimensional position indicating systems are also known for professional applications. One such apparatus is disclosed in U.S. Pat. No. 3,561,125 to Zeidler. In this apparatus a contacting tip element is supported on a range arm which itself is slidingly supported in a gimbal mechanism. This gimbal mechanism permits rotations about a vertical and a horizontal axis. Thus, by extending and rotating the range arm, points within a working volume can be contacted and signals responsive to the extension and rotation of the arm can be operated on in a digital computer to provide the three dimensional spherical coordinates of the desired point. This apparatus thus requires the measurement of the amount of linear extension of the range arm as well as two rotational measurements.

U.S. Pat. No. 3,944,798 to Eaton discloses apparatus particularly adapted for measuring directions. In this apparatus a grooved head is adapted for closely engaging pipes having arbitrary bends. The head is placed into engagement with the pipe and then moved along the pipe. The groove in the head defines a head working direction and it is this direction which can be stored in a digital computer. The working head is connected to a supporting plane by means of a plurality of arms which are pivotably connected to one another. The relative angle between pairs of arms is measured by means of electrical resolvers. This apparatus is bulky and expensive and designed for use with professional manufacturing, assembly and inspection operations. Furthermore, this apparatus employs resolvers for measuring angles.

It is an object of this invention, therefore, to provide a three dimensional graphics tablet or coordinate resolving apparatus which utilizes potentiometers to measure relative angles between link elements for coordinate determinations.

It is a further object of this invention to provide a three dimensional graphics tablet which is of relatively simple mechanical construction and inexpensive to manufacture.

A still further object of this invention is a three dimensional graphics tablet which is highly accurate and very reliable in operation.

These and other objects and advantages of the present invention will become apparent by reference to the reminder of this specification.

SUMMARY OF THE INVENTION

The three-dimensional graphics tablet according to the present invention includes a generally planar support on which is mounted an articulated arm having at least two link elements connecting a contacting tip element to the support. The articulated arm is supported for rotational movement about a plurality of mutually angulated axes so that the contacting tip element can be placed at arbitrary locations within a working volume. Potentiometers are provided which are responsive to rotation about each of the angulated axes so that signals are generated which collectively determine the coordinates of the tip element.

In one preferred embodiment three link elements are provided, a first of the link elements pivotably mounted to the support for rotation about a substantially vertical axis. A second link element is provided which is pivotably attached to the first link element for rotation about a substantially horizontal axis, and a third link element is pivotably attached to the second link element thereby providing three degrees of freedom. Another embodiment includes three link elements in which a first link element is mounted on the support for rotation about a first axis. The second link element has one end attached to the first link element for rotation about a second axis. The second link element is in two parts rotatably connected to one another and a third link element is provided which is attached to the second link element for rotation about another axis. This embodiment thus has four degrees of freedom which facilitates the contacting of the tip element with the object whose coordinates are to be determined.

BRIEF DESCRIPTION OF THE DRAWING

The invention disclosed herein will be better understood with reference to the appended drawing of which.

DESCRIPTION OF THE PREFERRED EMBODIMENT

Figure 1:
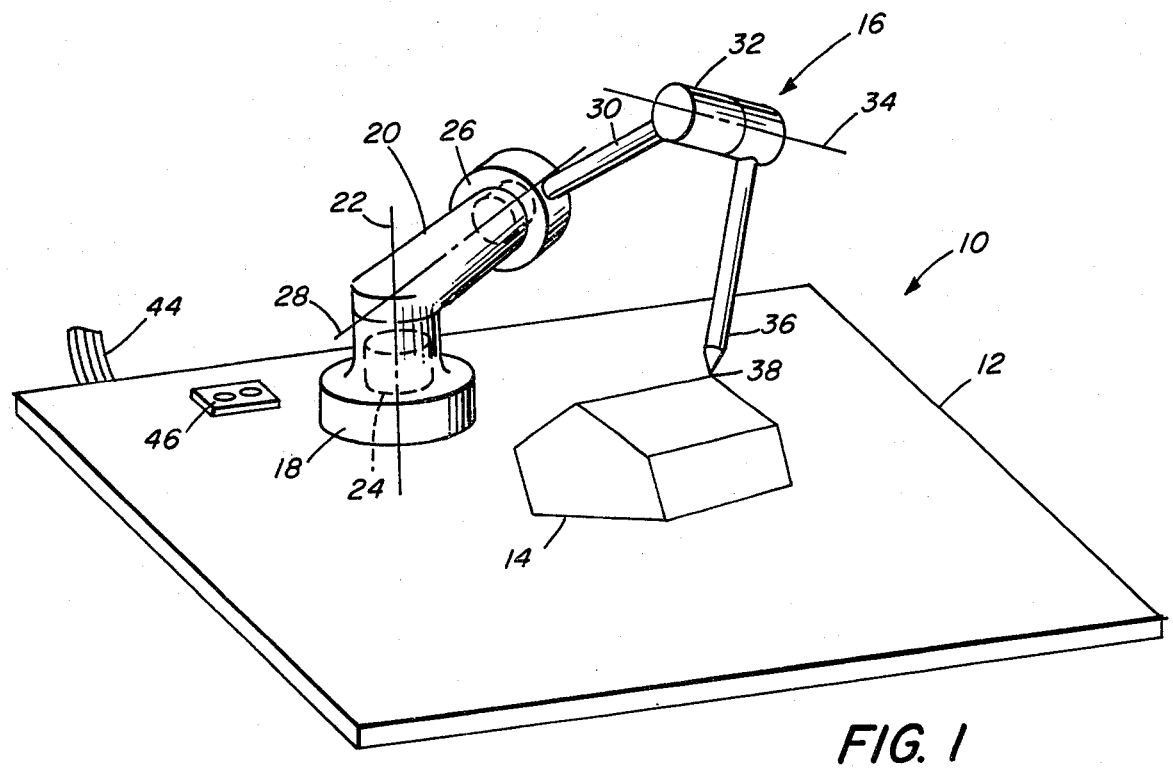
FIG. 1 is a perspective view of a three axis graphics tablet.

Like elements will be accorded the same reference numerals throughout the various figures of the drawing.

Figure 2:
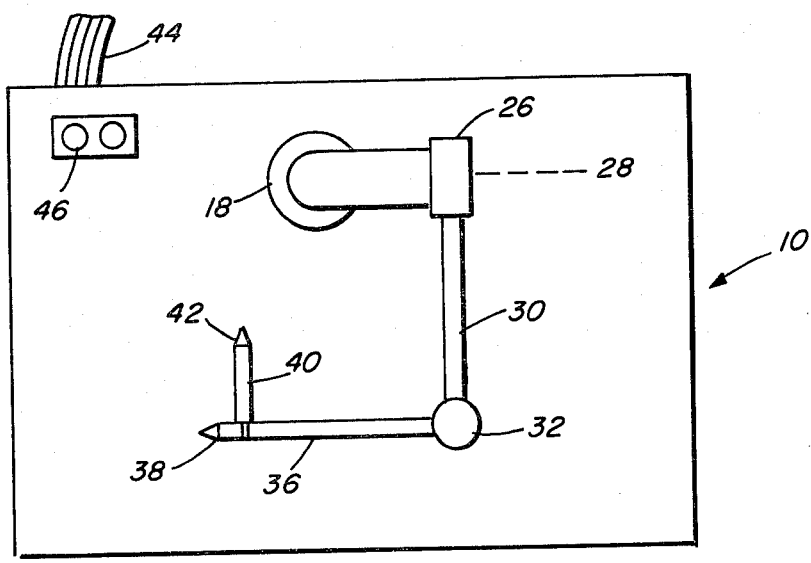
FIG. 2 is a schematic plan view of the three axis graphics tablet illustrating an alternative contact tip.

With reference first to FIGS. 1 and 2, a three-dimensional graphics tablet 10 includes a support 12 suited for supporting an object such as a scale model of a building 14 whose coordinates in three dimensions are to be determined by the graphics tablet 10. The support 12, preferably made of planar plastic material is adapted for supporting the coordinate measuring articulated arm assembly 16 to be described in detail below. The arm assembly 16 is supported by a mounting element 18 which will be described in more detail in conjunction with FIG. 5. The mounting element 18 supports a first link element 20 for rotation about an axis 22 which is substantially vertical. As will be described in more detail in conjunction with FIG. 5, the mounting element 18 contains a first potentiometer 24 whose shaft is fixedly attached to the link element 20. The potentiometer 24 is thus responsive to angular rotations of the link element 20 about the axis 22 and provides electrical signals which are an indication of this angle of rotation.

The link element 20 contains a second potentiometer 26 having an axis of rotation along an axis 28 which is substantially horizontal and coaxial with the link element 20. A second link element 30 is rotatably attached to the link element 20 so that the shaft of the second potentiometer 26 is fixedly attached to the second link element 30. The second potentiometer 26 thus produces electrical signals which represent an angle of rotation of the link element 30 about the axis 28. The second link element 30 carries on its far end a third potentiometer 32. The axis of rotation of the third potentiometer 32 is indicated by the numeral 34. Mounted for rotation about the axis 34 at the end of the second link element 30 is a third link element 36. The third link element 36 terminates in a well defined tip 38. The tip 38 is used to contact the surface of objects such as the object the three-dimensional coordinates of which are to be determined. As shown in FIG. 2 an auxilliary tip element 40 may be attached to the third link element 36 in order to facilitate reaching into otherwise awkward positions. The auxilliary tip element 40 also ends in a well defined tip 42. The use of the tips 38 and 42 will be described hereinafter. The graphics tablet 10 connects to a digital computer by means of leads 44, including a plurality of conductors. The leads 44 are adapted for supplying power to the potentiometers 24, 26 and 32, and for conveying signals from these potentiometers to an analog to digital converter which may either be a component of the host computer or may be incorporated into the three dimensional graphics tablet's own circuitry. In a preferred embodiment the potentiometer leads feed directly into the game I/O of an APPLE II computer or the game paddle adapter of an IBM Personal Computer. These two computers both contain simple A/D converters which permit conversion of the analog signals provided by each of the potientiometers into digital signals from which the associated angles are inferred. The angle calculation system will be subsequently described in more detail. Also provided are buttons or switches 46 which are utilized during data acquisition to be described below.

Because the articulated arm 16 has three degrees of rotational freedom about mutually perpendicular axes, it will be apparent to those skilled in the art that the tip 38 can be moved so as to contact the surface of three dimensional objects within a working volume. The auxilliary tip element 40 can be used to facilitate the contacting of surface locations which may be difficult to contact with the third link element 36. In particular the tip element 40 is useful for contacting inside surfaces of objects.

In operation, the leads 44 are attached to an appropriate computer input as discussed above. The tip 38 of the third link element 36 or the tip 42 of the auxilliary element 40 is then brought into contact with the surface of the object whose coordinates are to be determined. When the tip is in contact with the surface the host computer will interrogate each of the potentiometers so as to permit the signals from the first, second and third potentiometers to enter the computer. As will be understood by those skilled in the art, the signals representing the angular rotations about the three axes along with the lengths and geometry of the link elements uniquely determine the coordinates at the tip 38. Thus as the tip 38 traverses the surface of an object, coordinates of the successive tip locations can be fed into the memory of the computer. The computer may perform its interrogation of the potentiometers at regular time intervals, thus permitting nearly continuous coordinate tracing or may do so only when some indication is provided that the user wants the coordinates recorded. For example a button 46 may be depressed indicating that the machine is to record a point.

Clearly by a sequence of simple coordinate transformations composed of translations along the links and rotations about the joints, one can calculate the position of the pointer tips 38 and 42 in the frame of reference defined by the support plate 12. This is equally true of the three axis embodiment and the four axis version described below. The four axis version simply requires one additional transformation to be calculated.

Another important embodiment of this invention will now be described in conjunction with FIGS. 3 and 4. As will be seen, this employment employs an articulated arm having four degrees of rotational freedom to facilitate locating the tip element on the surface of irregularly shaped objects. A three-dimensional graphics tablet 50 includes a rigid support 52 which supports a mounting element 54. The mounting element 54 includes a potentiometer 56 having a shaft supported for rotation about an axis 58. A link element 60 is rotatably mounted on the support member 54 and fixedly attached to the shaft of the potentiometer 56. Link element 60 includes a potentiometer 62 having an axis of rotation along an axis 64. A second link element 66 is rotatably attached to the element 60 for rotation about the axis 64. The second link element 66 includes a base portion 68 and an arm portion 70. The base portion 68 of the second link element 66 includes a potentiometer 72 having a shaft aligned for rotation about an axis 74. The arm portion 70 is co-axially rotatably connected to the base portion 68 so that rotation of the arm portion 70 rotates the shaft of the potentiometer 72. The far end of the arm element 70 is rigidly connected to another potentiometer 76 having a shaft aligned along an axis 78. The shaft of the potentiometer 76 is connected to a third link element 80. The link element 80 has a well defined tip 82 for contacting objects whose coordinates are to be determined. In addition, there is provided an auxilliary element 84 also having a sharply defined tip 86. The auxilliary tip element 84 is removeably attached to the link element 80 and can be used to contact surfaces which might not be reachable by the tip 82. The graphics tablet 50 also includes a plurality of leads contained within a cable 88. These leads are adapted to be connected to a digital computer as discussed above with reference to the embodiment of FIG. 1. Buttons or switches 90 are provided for use during data acquisition.

As with the embodiment illustrated in FIGS. 1 and 2, the graphics tablet 50 is operated by moving the tip 82 or the tip 86 into contact with the surface of three dimensional objects. The extra degree of freedom in the articulated arm facilitates contacting surfaces which might otherwise be inaccessible, such as, for example, the interior of convoluted surfaces.

As will be readily apparent to those skilled in the art, the signals from the four potentiometers 56, 62, 72 and 76 along with the lengths and geometry of the link elements of the articulated arm uniquely define the location of the tip 82 or the tip 86. The procedure is analogous to that described in conjunction with the embodiment of FIG. 1.

Figure 5:
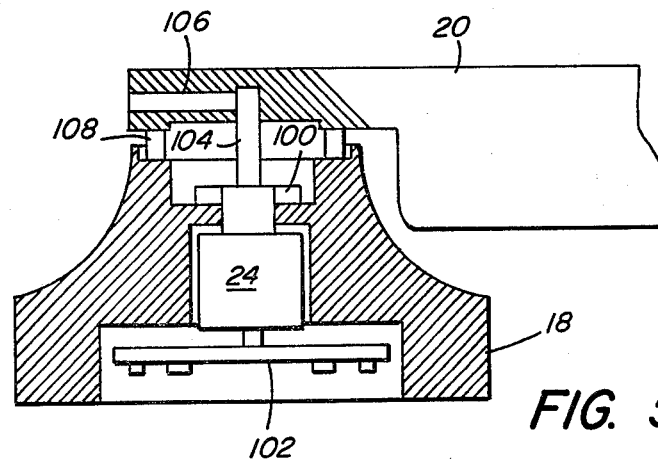
FIG. 5 is a cross-sectional view of a mounting element supporting a potentiometer and one of the link elements.

FIG. 5 shows details of the mounting element 18 (or 54). The mounting element 18 is preferably made of a rigid material such as Deldrin or aluminum. The potentiometer 24 is secured to the mounting element 18 by means of a retainer nut 100. The potentiometer 24 is electrically connected to a printed circuit board 102 which functions as a signal conditioner. The printed circuit board 102 is connected to a digital computer (not shown) by means of leads 44 and 88 shown in FIGS. 1 and 3. The first link element 20 is attached to a shaft 104 of the potentiometer 24 by means of a set screw 106. The link element 20 rests on a wave washer 108 so that the link element 20 may rotate with respect to the mounting element 18 with greater stability than it would if the wave washer were not present.

Figure 3:
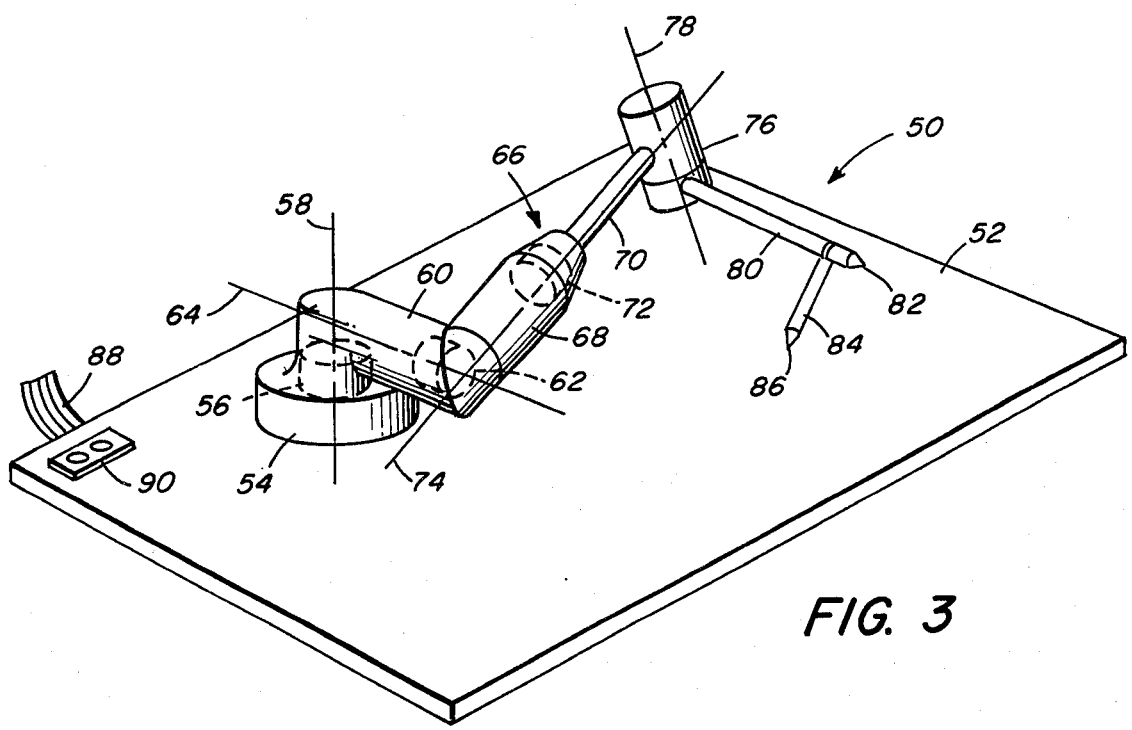
FIG. 3 is a perspective view of a four axis embodiment of the graphics tablet disclosed herein.
Figure 4:
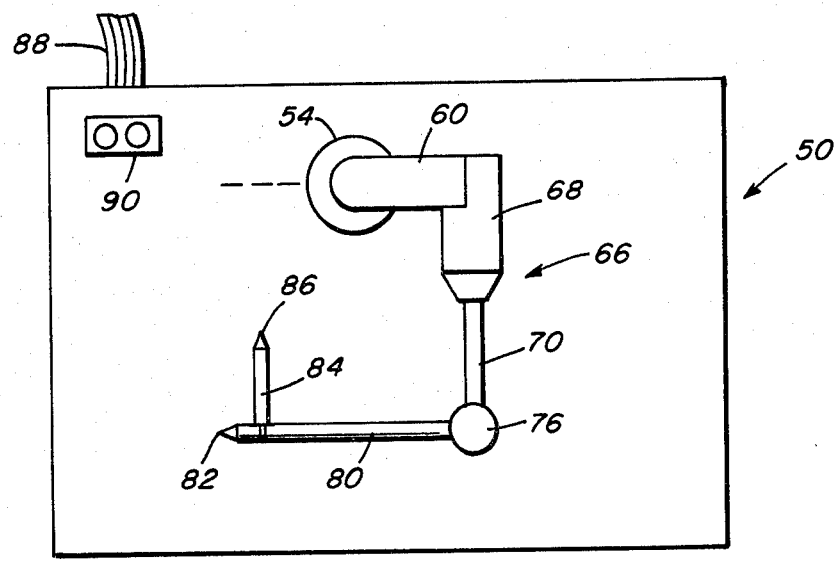
FIG. 4 is a plan view of the four axis, three dimensional graphics tablet.
Figure 6:
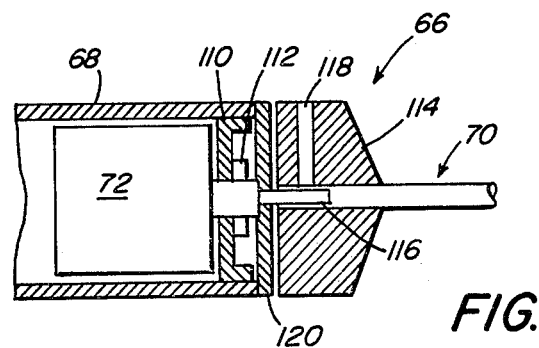
FIG. 6 is a cross-sectional view of another potentiometer and its axial connection to a link element.

FIG. 6 shows some of the details of the link element 66 shown in FIGS. 3 and 4. The base portion 68 is preferably made of aluminum. An insert 110 is pressed into the end of the tube 68 and fixed in pace, e.g., with glue. The potentiometer 72 is secured to the insert 110 by means of a retaining nut 112. The arm portion 70 includes a member 114 which is attached to a shaft 116 of the potentiometer 72 by means of a set screw 118. A wave washer 120 is interposed between the element 114 and the base portion 68 so as to increase stability, and therefore reliable positioning.

Figure 7:
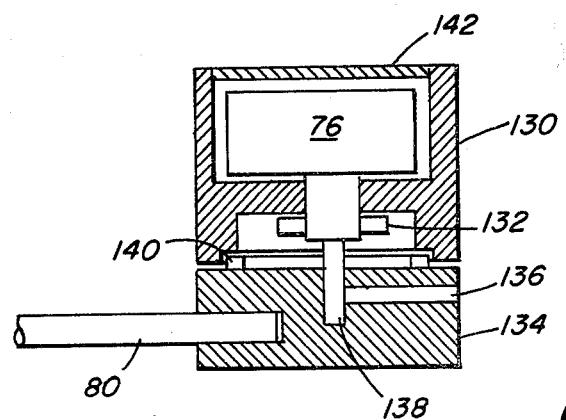
FIG. 7 is a cross-sectional view showing a potentiometer rotatably connected to a link element.

With reference now to FIG. 7, the potentiometer 76 described above in relation to FIG. 3 is housed within a case 130 preferably machined from aluminum or plastics material. The potentiometer 76 is secured within the case 30 by means of a retaining nut 132. The link element 80 is rigidly affixed to a mounting element 134 which is secured by means of a set screw 136 to a shaft 138 of the potentiometer 76. A wave washer 140 is interposed between the element 134 and the case 130. The top of the case 130 is closed by means of a cap 142.

The graphics tablets disclosed herein are thus particularly adapted for determining the three-dimensional coordinates of objects by introducing into a digital computer signals responsive to the angular rotations of articulated arm elements generated by potentiometers. Not only can a digital computer be readily programmed to determine the coordinates of the contacted points by operating on the potentiometer generated signals, but the series of contacted points can be joined to form wire frame pictures which can be displayed on a television monitor or sent to a remote location for display. Objects can be digitized directly or can be drawn free hand. Thus this device can be used in three dimensional computer aided design applications (CAD).

It will thus be seen that the objects of this invention have been achieved in that there has been disclosed graphics tablet apparatus for determining the three-dimensional coordinates of objects which is easy to manufacture, low in cost, and highly accurate and reliable. Angles of rotation are measured with potentiometers which do not require complex electronic circuitry for their operation. While the invention disclosed herein has been described with reference to the preferred embodiments, it should be understood that these embodiments are illustrative only. Variations and modifications will occur to those skilled in the art, and it is intended that all such variations and modifications fall within the scope of the appended claims. In particular, it will be apparent to those skilled in the art that two link elements will suffice if one of the elements is supported for rotation about two mutually angulated axes and the other link element is connected to the first element for rotation about a single axis. Furthermore, although potentiometers are the preferred means for measuring angular rotations because of their low cost, simplicity, accuracy and reliability, other devices such as optical enroders can be used. It should also be noted that the potentiometers may be flipped end for end reversing the locations of the shaft and winding of the potentiometer.

What is claimed is:

1. A three-dimensional graphics tablet comprising:
a support;
a contacting tip element; and
an articulated arm assembly connecting said contacting tip element to said support, said arm assembly comprising a first link element rotatably connected to said support for rotation about a first axis, a second link element rotatably connected to said first link element for rotation about a second axis, said second link element having two sections interconnected for relative rotation about a third axis, and a third link element rotatably connected to said second link element for rotation about a fourth axis, and further including first, second, third and fourth potentiometers for measuring the angles of rotation about the first, second, third and fourth axes respectively and for producing electrical signals responsive to said rotations, whereby said signals collectively determine the coordinates of said tip element.

2. The graphics tablet of claim 1 wherein said first axis is substantially vertical, said second axis is substantially horizontal, said third axis is generally colinear with said second link element, and said fourth axis is perpendicular to said second link element.

3. The graphics tablet of claim 1 further including an auxiliary tip element disposed perpendicularly to said third link element.

* * * * *